US012592393B2

(12) United States Patent
Wegener et al.

(10) Patent No.: US 12,592,393 B2
(45) Date of Patent: Mar. 31, 2026

(54) CATALYST SYSTEM, ELECTRODE AND FUEL CELL OR ELECTROLYZER

(71) Applicant: Schaeffler Technologies AG & Co. KG, Herzogenaurach (DE)

(72) Inventors: Moritz Wegener, Erlangen (DE); Yahsar Musayev, Nuremberg (DE); Jeevanthi Vivekananthan, Herzogenaurach (DE); Detlev Repenning, Reinbeck (DE); Ladislaus Dobrenizki, Hochstadt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 715 days.

(21) Appl. No.: 17/291,096

(22) PCT Filed: Nov. 6, 2019

(86) PCT No.: PCT/DE2019/100955
§ 371 (c)(1),
(2) Date: May 4, 2021

(87) PCT Pub. No.: WO2020/103976
PCT Pub. Date: May 28, 2020

(65) Prior Publication Data
US 2022/0006103 A1     Jan. 6, 2022

(30) Foreign Application Priority Data

Nov. 20, 2018     (DE) ......................... 102018129104.3

(51) Int. Cl.
*H01M 4/92*       (2006.01)
*H01M 4/86*       (2006.01)
(Continued)

(52) U.S. Cl.
CPC ......... *H01M 4/926* (2013.01); *H01M 4/8657* (2013.01); *H01M 4/9016* (2013.01);
(Continued)

(58) Field of Classification Search
CPC ...................................................... H01M 4/86
See application file for complete search history.

(56) References Cited

U.S. PATENT DOCUMENTS 10,985,385 B2      4/2021   Dobrenizki et al.
2005/0158609 A1 *   7/2005   Finkelshtain ......... H01M 8/065
429/444
(Continued)

FOREIGN PATENT DOCUMENTS

CN       104662720 A     5/2015
CN       108808028 A  * 11/2018   ............ H01M 4/925
(Continued)

OTHER PUBLICATIONS

Prieto, Gonzalo, et. al., Hollow Nano- and Microstructures as Catalysts, 116 (22) Chem. Rev. 14056-14119 (Oct. 7, 2016). (Year: 2016).*
(Continued)

*Primary Examiner* — Nicole M. Buie-Hatcher
*Assistant Examiner* — Krishna R Hammond
(74) *Attorney, Agent, or Firm* — Volpe Koenig

(57)                ABSTRACT

A catalyst system (9), an electrode (1) which includes the catalyst system (9), and a fuel cell (10) or an electrolyzer having at least one such electrode (1) are provided. The catalyst system (9) includes an electrically conductive carrier metal oxide and an electrically conductive, metal oxide catalyst material. A near-surface pH of the carrier metal oxide and the catalyst material differ. The catalyst material and the carrier metal oxide form an at least two-phase disperse oxide composite. The carrier metal oxide has a first
(Continued)

crystal lattice structure having first oxygen lattice sites and first metal lattice sites, wherein the carrier metal oxide on the first oxygen lattice sites is preferably doped with at least one element from the group including nitrogen, carbon, and boron, and is optionally additionally doped with hydrogen. The carrier metal oxide has a second crystal lattice structure having second oxygen lattice sites and second metal lattice sites, wherein the catalyst material on the second oxygen lattice sites is preferably doped with fluorine and at least one element from the group including nitrogen, carbon and boron, and optionally additionally doped with hydrogen.

15 Claims, 3 Drawing Sheets

(51) Int. Cl.
| | | |
|---|---|---|
| *H01M 4/90* | (2006.01) | |
| *H01M 8/10* | (2016.01) | |
| *H01M 8/1018* | (2016.01) | |

(52) U.S. Cl.
CPC ......... *H01M 4/921* (2013.01); *H01M 8/1018* (2013.01); *H01M 2008/1095* (2013.01)

(56) References Cited

U.S. PATENT DOCUMENTS

| | | | |
|---|---|---|---|
| 2008/0026282 A1* | 1/2008 | Tamura | |
| 2014/0224666 A1 | 8/2014 | Kintrup et al. | |
| 2014/0322631 A1 | 10/2014 | Klose-Schubert et al. | |
| 2014/0349203 A1* | 11/2014 | Klose-Schubert | |
| 2015/0118582 A1* | 4/2015 | Badding | |
| 2015/0221955 A1 | 8/2015 | Dale et al. | |
| 2015/0243999 A1 | 8/2015 | Takahashi et al. | |
| 2015/0368817 A1 | 12/2015 | Xu et al. | |

FOREIGN PATENT DOCUMENTS

| | | | | |
|---|---|---|---|---|
| DE | 102008036849 | | 2/2010 | |
| DE | 102016202372 | | 8/2017 | |
| DE | 102016203936 A1 * | | 9/2017 | .......... H01M 4/8605 |
| EP | 2608298 | | 6/2013 | |
| JP | 2008034300 | | 2/2008 | |
| JP | 2014161786 | | 9/2014 | |
| JP | 2015502646 | | 1/2015 | |
| KR | 100785519 B1 * | | 12/2007 | |
| WO | 2013134759 | | 9/2013 | |
| WO | 2018047968 | | 3/2018 | |

OTHER PUBLICATIONS

Rabis, A., "The Impact of Metal Oxides on the Electrocatalytic Activity of Pt Catalysts", 154 pages, ETH Zurich 2015.

Kadakia, K. [u.a.]. "Fluorine doped (Ir,Sn,Nb)O2 anode electrocatalyst for oxygen evolution via PEM based water electrolysis". In: International Journal of Hydrogen Energy 39, pp. 664-674, (2014).

Kim, Sung S.: "Thermodynamic modeling of the Ta2O5-SnO2 phase diagram". In: Journal of the American Ceramic Socity, vol. 95, 2012, No. 12, pp. 4004-4007. ISSN 1551-2916 (E); 0002-7820 (P). DOI: 10.1111/j.1551-2916.2012.05436.x. URL: https://onlinelibrary. wiley.com/doi/epdf/10.1111/j.1551-2916.2012.05436.x [retrieved on Dec. 17, 2018] (2012).

Shestakova, M. [u.a.]. "Novel Ti/Ta2O5-SnO2 electrodes for water electrolysis and electrocatalytic oxidation of organics". In: Electrochimica Acta 120, pp. 302-330, (Jan. 4, 2014).

Takahashi, K. [u.a.]. "Improvement of Cell Performance in Low-Pt-Loading PEFC Cathode Catalyst Layers with Pt/Ta-SnO2 prepared by the Electrospray Method". In: Journal of the Electrochemical Society, 164 (4), pp. F235-F242, (Jan. 27, 2017).

* cited by examiner

CATALYST SYSTEM, ELECTRODE AND FUEL CELL OR ELECTROLYZER

CROSS-REFERENCE TO RELATED APPLICATIONS

This application is the U.S. National Phase of PCT Appln. No. PCT/DE2019/100955, filed Nov. 6, 2019, which claims priority to DE 102018129104.3, filed Nov. 20, 2018, the entire disclosures of which are incorporated by reference herein.

TECHNICAL FIELD

The disclosure relates to a catalyst system comprising a carrier metal oxide and a metal oxide catalyst material. The invention further relates to an electrode, which comprises the catalyst system. The invention further relates to a fuel cell or an electrolyzer comprising at least one such electrode and a polymer electrolyte membrane.

BACKGROUND

For more than 20 years, leading automobile manufacturers have been working on fuel cells with hydrogen as an energy carrier. In the entire chain, from production from raw materials to recycling, fuel cells have a favorable "$CO_2$ footprint", although the efficiency of fuel cells together with hydrogen generation from renewable sources is significantly lower than that of battery-powered cars. Furthermore, fuel cells have significantly worse performance dynamics than batteries. The reason for this is that the reactants hydrogen and oxygen can only be transported into the reaction chambers of the fuel cell with a time delay in the event of sudden power requirements. This is why the model of a hybrid system consisting of a fuel cell and a lithium battery is becoming increasingly popular. The fuel cell takes over the basic load in the driving behavior of the car and the battery is switched on as a "power generator" for the short power peaks in the typical driving cycles of a car.

The focus is therefore on increasing the efficiency of fuel cells. Fuel cells have a theoretical, thermodynamically based efficiency of approx. 90-95% in the operating temperature window of T=80-90° C. for the polymer electrolyte membrane fuel cells. Technically, however, efficiencies of only 50-60% are currently achieved in the best case. One of the main reasons for this is the high overvoltages of the oxygen reduction reaction on a platinum catalyst. So far, platinum has been considered the best catalyst for reducing oxygen in a fuel cell, but owing to the high price thereof it should be avoided or at least used very sparingly.

Oxide-based compounds, for example, are another class of catalysts. US 2015/0 368 817 A1 discloses a catalyst system for the anode side of an electrolyzer, comprising a support and a plurality of catalyst particles which are arranged on the support. The carrier comprises a plurality of metal oxide particles or doped metal oxide particles. The catalyst particles are based on the precious metals iridium, iridium oxide, ruthenium, ruthenium oxide, platinum, or platinum black and are therefore correspondingly expensive. The particles of the carrier including the catalyst particles are dispersed in a binder.

DE 10 2008 036 849 A1 discloses a bipolar plate unit for a fuel cell comprising a base body, a coating on the anode side and a coating on the cathode side, wherein the coatings have different compositions. The coating on the cathode side comprises a metal oxide, in particular in the form of tin oxide, which is doped with fluorine.

Almost all oxidic or partially oxidic catalyst systems, especially for fuel cells or electrolyzers, have a high sensitivity to hydrolysis, which leads to a decrease in the catalytic capabilities in cell operation.

SUMMARY

The object of the disclosure is to provide a catalyst system for the improved reduction of oxygen, in particular for use in fuel cells or electrolyzers, which manages without precious metals or with only a very small use of precious metals. A further object of the disclosure is to provide an electrode, a fuel cell, and an electrolyzer comprising such a catalyst system, wherein an improved efficiency for the latter should result.

The object is achieved for the catalyst system in that it comprises an electrically conductive carrier metal oxide having an electrical conductivity $\lambda_1$ of at least 10 S/cm is comprehensively formed, wherein the carrier metal oxide has at least two first metallic elements selected from the group of non-precious metals and has a structure comprising oxide grains with a grain size of at least 30 nm, an electrically conductive metal oxide catalyst material is formed with an electrical conductivity $\lambda_2$ of at least 10 S/cm, the catalyst material having at least one second metallic element from the group of non-noble metals, wherein the first metallic elements in the carrier metal oxide and the at least one second metallic elements are present in the catalyst material in a solid stoichiometric compound or solid homogeneous solution, wherein the carrier metal oxide has a first crystal lattice structure comprising first oxygen lattice sites and first metal lattice sites, wherein the carrier metal oxide is doped on the first oxygen lattice sites with fluorine and/or at least one element of the group comprising nitrogen, carbon, boron, and optionally additionally doped with hydrogen, wherein the catalyst material has a second crystal lattice structure comprising second oxygen lattice sites and second metal lattice sites, wherein the catalyst material on the second oxygen lattice sites is doped with fluorine and at least one element from the group comprising nitrogen, carbon, boron, and optionally additionally doped with hydrogen, wherein the carrier metal oxide and the catalyst material differ in the composition thereof, and wherein a near-surface pH, called a pzzp value (pzzp=point of zero zeta potential), of the carrier metal oxide and that of the catalyst material differ, and the catalyst material and the carrier metal oxide form an at least two-phase disperse oxide composite.

The advantage of such a catalyst system lies in the significantly improved ionic and electronic conductivity thereof, the excellent adsorption and desorption capacity for oxygen and hydroxyl groups, and a reduced sensitivity to hydrolysis and thus high long-term stability.

The carrier metal oxide in particular has a first crystal lattice structure comprising first oxygen lattice sites and first metal lattice sites, wherein the carrier metal oxide on the first oxygen lattice sites is preferably doped with at least one element from the group comprising nitrogen, carbon and boron. Optionally, hydrogen is also available as a doping element. A doping element here replaces oxygen on a first oxygen lattice site. The doping is preferably present in a molar fraction of at most 0.06, based on non-metallic elements in the carrier metal oxide.

The catalyst material according to the disclosure has a second crystal lattice structure comprising second oxygen lattice sites and second metal lattice sites, wherein the catalyst material on the second oxygen lattice sites is doped with fluorine and at least one element from the group comprising nitrogen, carbon, and boron. Optionally, hydrogen is also available as a doping element. The doping element replaces oxygen on a second oxygen lattice site. The doping is preferably present in a molar fraction of at most 0.1, based on non-metallic elements in the carrier metal oxide.

In a preferred embodiment of the catalyst system, the carrier metal oxide and the catalyst material differ in the surface energy thereof, wherein a first phase of the at least two-phase disperse oxide composite has a more hydrophobic surface than a further surface of the at least one further phase. In particular, a surface energy of the more hydrophobic surface of the first phase is <30 Nm/mm$^2$, in particular in the range from 22 to 28 Nm/mm$^2$. A surface energy of the further surface of the at least one further phase is preferably greater than 35 Nm/mm$^2$.

The targeted adjustment of the energy states of the surfaces significantly improves the electron transfer capability of the catalyst system. There is the possibility of reliably setting a three-phase reaction zone and the further possibility that oxygen is preferentially adsorbed on the more hydrophobic surface and desorbed on the less hydrophobic surface more than water in what is termed a "spill-over" mechanism.

The specific adjustment of the hydrophilic to hydrophobic surfaces of the carrier metal oxide and the catalyst material takes place through a specific treatment with fluorine-containing gases, such as carbon tetrafluoride CF$_4$. Such a surface treatment takes place under vacuum at a pressure of approx. 100 Pa in a gas mixture of argon, CF$_4$, and traces of hydrogen at a temperature in the range from 650 to 750° C. Alternatively, such a surface treatment takes place under vacuum at a pressure of approx. 100 Pa in a gas mixture of argon, CF$_4$, and traces of hydrogen at a temperature in the range from 450 to 550° C. with the formation of a plasma by microwave irradiation. At the same time, the surfaces of the carrier metal oxide and the catalyst material are acted upon with at least one doping element from the group comprising nitrogen, carbon, boron. Mathematically, with a 100 nm grain and a diffusion coefficient of D≈10-12 cm$^{-2}$, a concentration equalization for nitrogen, for example, can be expected within a treatment time of t<1 h.

This is followed by a temperature treatment in the temperature range of 200-400° C. for thermodynamic stabilization and conditioning of the surface of the catalyst system.

The catalyst material can be inherently disperse or coherently disperse in the carrier metal oxide and/or deposited on a surface of the carrier metal oxide.

The catalyst system according to the disclosure manages without precious metals. It is therefore interesting in terms of price and opens up great potential for cost savings, especially in the automotive industry.

The carrier metal oxide and the oxidic catalyst material are stabilized by doping them with fluorine. In particular, the proportion of fluorine in the catalyst system is a maximum of 2 mol % based on the oxygen content. The fluorine is evenly distributed in the oxide lattice and increases the long-term chemical stability and electrical conductivity of the carrier metal oxide and the catalyst material of the catalyst system.

In particular, the first metallic elements for forming the carrier metal oxide comprise at least two metals from the group consisting of tin, tantalum, niobium, titanium, hafnium, and zirconium. In particular, first metallic elements are used in combination, the electrochemical valence of which is different. In particular, the first metallic elements include tin and furthermore at least one metal from the group consisting of tantalum, niobium, titanium, hafnium, and zirconium. A combination of the first metallic elements tin and tantalum or tin and niobium is particularly preferred. With a solid solution of 1.1 mol % tantalum oxide Ta$_2$O$_5$ in tin oxide SnO$_2$ or 2.1 mol % Nb$_2$O$_5$ in tin oxide SnO$_2$, the carrier metal oxide achieves an electrical conductivity $\lambda_1$ in the range of 7*10$^2$ S/cm. However, combinations of tin and titanium, tin and hafnium, tin and zirconium, titanium and tantalum, titanium and niobium, zirconium and niobium, zirconium and tantalum, hafnium and niobium, or hafnium and tantalum have proven to be useful here for the formation of the carrier metal oxide.

The oxidic catalyst material preferably has a structure comprising oxide grains with a grain size in the range from 1 nm to 50 nm. The at least one second metallic element of the oxidic catalyst material is preferably formed by at least one non-precious metal from the group consisting of tantalum, niobium, zirconium, hafnium, iron, tungsten, and molybdenum. In particular, at least two second metallic elements are used in combination. The second metallic elements in particular have an electrochemical valence that is different, such as (Ta,Fe)$_2$O$_5$, (Nb,W)$_2$O$_5$, and the like.

The carrier metal oxide is preferably doped with at least one element from the group comprising iridium and ruthenium on the first metal lattice sites on which the first metallic elements are arranged. In this case, doping elements for which the valence is different from that of the first metallic elements are selected. The doping element is preferably installed on a first metal lattice site instead of a first metallic element. The doping is preferably present in a molar fraction of at most 0.1 of the first metallic elements in the carrier metal oxide.

The near-surface pH, called pzzp value (pzzp=point of zero zeta potential), of the carrier metal oxide and the catalyst material differ in a preferred embodiment. The advantage of the catalyst, which is set to be even more acidic on the surface, is that the oxygen reduction is shifted even more easily in the direction of the product (water) in accordance with the law of mass action.

The catalyst material has a second crystal lattice structure comprising second oxygen lattice sites and second metal lattice sites, wherein the catalyst material on the second metal lattice sites is preferably doped with at least one element from the group comprising titanium, zirconium, hafnium, vanadium, niobium, tantalum, iron, tungsten, molybdenum, iridium, rhodium, ruthenium, and platinum. The use of iridium to adjust the electrical conductivity is particularly preferred as a stable generator of mixed oxide phases. In this case, doping elements are selected that are different from the at least one second metallic element. The doping element is preferably installed on a second metal lattice site instead of a second metallic element. The doping is preferably present in a molar fraction of at most 0.1 of the at least one second metallic element.

Particularly preferred here are catalyst systems based on:
α-tin oxide-tantalum oxide phase/thoreaulite phase SnTa$_2$O$_7$
α-tin oxide-niobium oxide phase/froodite phase SnNb$_2$O$_7$
α-tin oxide-tantalum oxide phase/β-tantalum oxide-tin oxide phase
α-tin oxide-niobium oxide phase/β-niobium oxide-tin oxide phase In the first two cases, the highly conductive α-tin oxide phase serves as the carrier metal oxide and the thoreaulite phase or the froodite phase form the catalyst material. In the latter two cases, the α-tin oxide phases are again present as the carrier metal oxide and the β phases form the catalyst material.

Platinum can additionally be applied to a surface of the catalyst system in an amount of at most 0.1 mg/cm² based on a coating area and independently of a coating thickness of the catalyst system. This increases the conductivity of the catalyst system without significantly increasing the costs therefor.

The object is also achieved for an electrode which comprises a catalyst system according to the invention. The current densities that can be achieved with an electrode of this type are 5 to 8 times higher at a cell voltage in the range from 700 to 800 mV than with the known oxide compounds from the prior art mentioned above. In particular, the electrode is designed as a cathode.

The electrode furthermore preferably comprises at least one ionomer and at least one binder. The at least one binder preferably comprises at least one fluorinated hydrocarbon and/or at least one polysaccharide. In particular, the polysugar consists of carboxymethyl cellulose and/or xanthan and/or alginate and/or agar-agar and/or another acid-stable polysugar.

The electrode preferably has a coating thickness in the range of from 0.5 to 20 μm. In an advantageous further development, platinum is applied to a free surface of the electrode in an amount of at most 0.2 mg/cm². This increases the electrical conductivity of the electrode, again without significantly increasing the costs therefor.

The object is also achieved for a fuel cell or an electrolyzer in that they are designed to include at least one electrode according to the disclosure and at least one polymer electrolyte membrane. In particular, the fuel cell is an oxygen-hydrogen fuel cell.

In particular, the electrode forms the cathode of a cell. The electrode is preferably arranged on a cathode side of a bipolar plate, wherein a gas diffusion layer can be arranged between the electrode and a metallic carrier plate of the bipolar plate.

The polymer electrolyte membrane and the ionomer of the electrode are preferably formed from identical materials. This significantly improves the transport of the oxygen ions formed on the surface of the electrode designed as a cathode, i.e., the cathode surface, to the polymer electrolyte membrane and thus significantly improves the efficiency of a fuel cell or an electrolyzer.

BRIEF DESCRIPTION FO THE DRAWINGS

FIGS. 1 to 6 and Table 2 are intended to explain the disclosure in an exemplary manner.

In the figures:

FIG. 1 shows a bipolar plate having an electrode containing the catalyst system;

FIG. 2 schematically shows a fuel cell system comprising a plurality of fuel cells;

FIG. 4 shows a section through two bipolar plates and a polymer electrolyte membrane according to FIG. 2 arranged there between;

DETAILED DESCRIPTION

Figure 1:
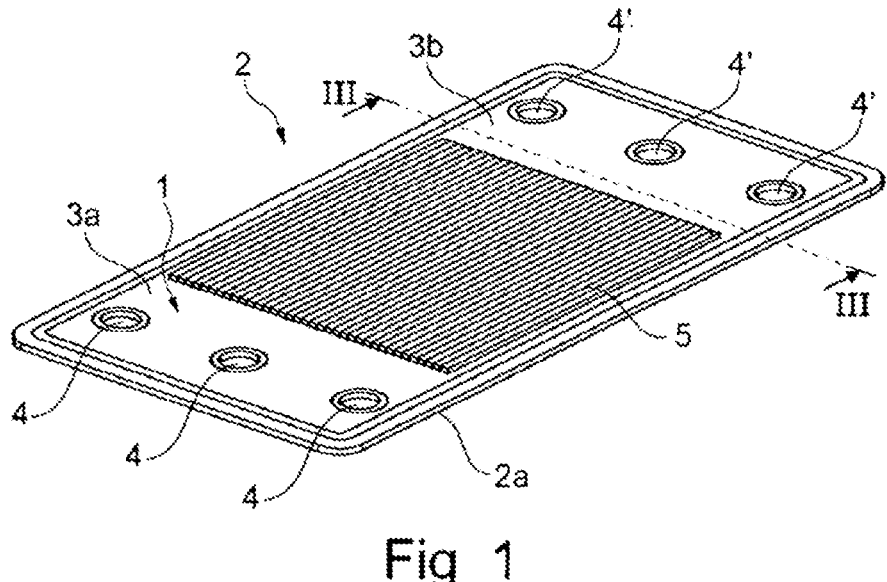

FIG. 1 shows an electrode 1 on a bipolar plate 2 which has a carrier plate 2a. The electrode 1 contains the catalyst system 9 (see FIG. 3) and forms a cathode. The electrode 1 has a coating thickness in the range of from 1 to 2 μm and, in addition to the catalyst system 9, also comprises an ionomer and a binding agent in the form of agar-agar. The bipolar plate 2 has an inflow region 3a with openings 4 and an outlet region 3b with further openings 4' which are used to supply a fuel cell with process gases and to remove reaction products from the fuel cell. The bipolar plate 2 also has a gas distribution structure 5 on each side, which is provided for contact with a polymer electrolyte membrane 7 (see FIG. 2).

Figure 2:
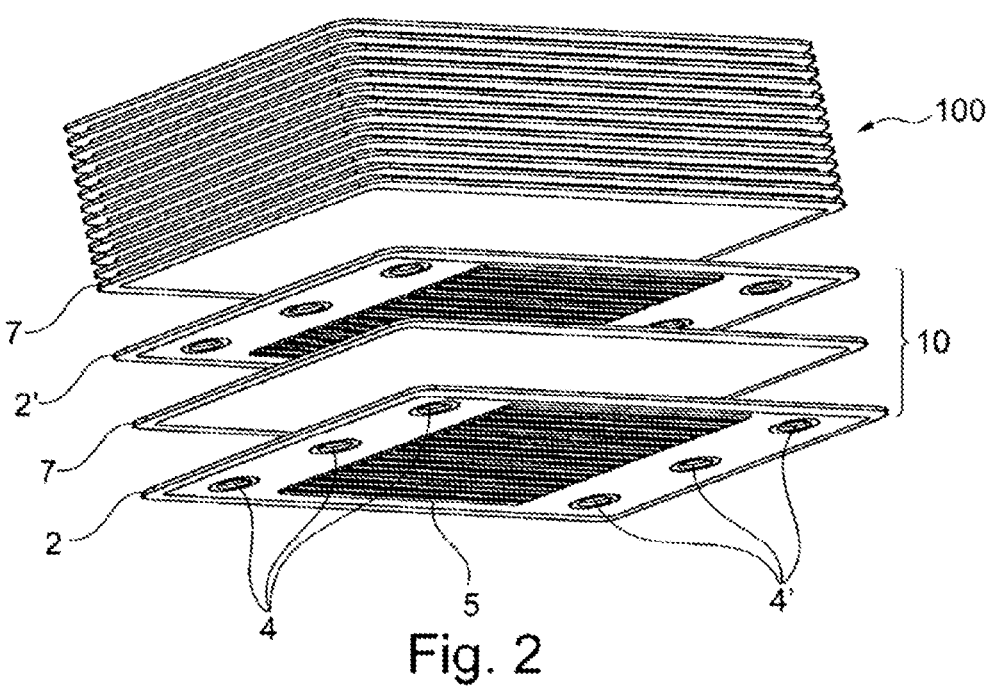

FIG. 2 schematically shows a fuel cell system 100 comprising a plurality of fuel cells 10. Each fuel cell 10 comprises a polymer electrolyte membrane 7 which is adjacent to both sides of bipolar plates 2, 2'. The same reference symbols as in FIG. 1 indicate identical elements.

Figure 3:
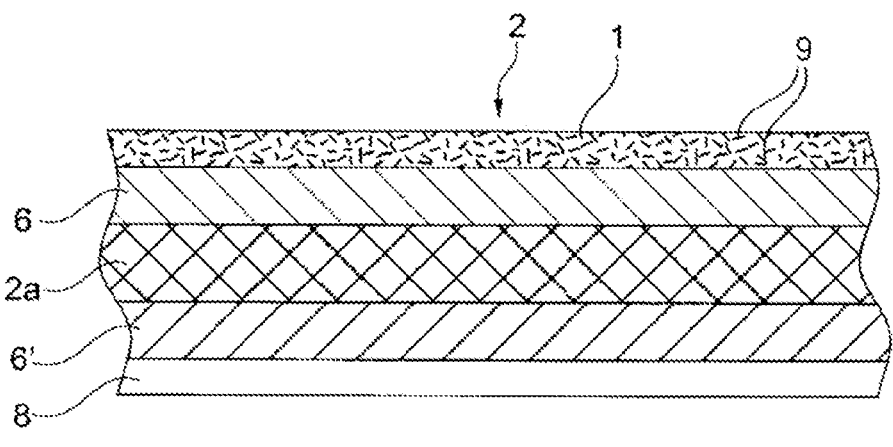
FIG. 3 shows a section III-III through the arrangement according to FIG. 1.

FIG. 3 shows a section III-III through the bipolar plate 2 according to FIG. 1. The same reference symbols as in FIG. 1 indicate identical elements. The carrier plate 2a, which is formed here from stainless steel, can be seen, which can be constructed in one part or in several parts. A gas diffusion layer 6 is arranged between the carrier plate 2a and the electrode 1 which contains the catalyst system 9. It can also be seen that a further anode-side coating 8 of the carrier plate 2a is provided. This is preferably a coating 8 which is designed according to DE 10 2016 202 372 A1. A further gas diffusion layer 6' is located between the coating 8 and the carrier plate 2a. The gas diffusion layers 6, 6' are designed to be electrically conductive.

Figure 4:
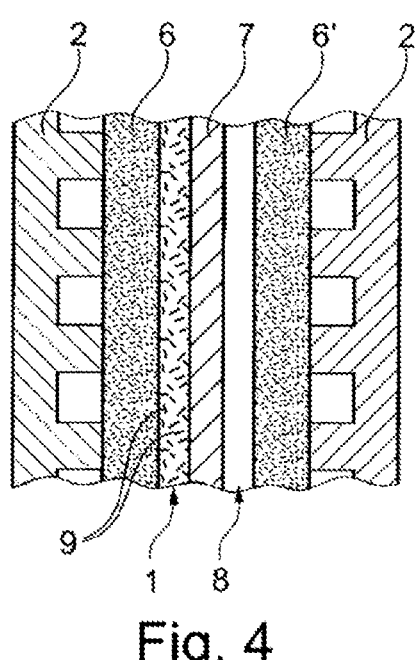

FIG. 4 shows a section through two bipolar plates 2, 2' and a polymer electrolyte membrane 7 according to FIG. 2 arranged therebetween, which together form a fuel cell 10. The same reference symbols as in FIGS. 1 and 3 indicate identical elements. It can be seen that the electrode 1 of the bipolar plate 2 as the cathode and the coating 8 of the bipolar plate 2' as the anode are arranged adjacent to the polymer electrolyte membrane 7. The gas diffusion layers 6, 6' can also be seen.

In the following, a catalyst system 9 is presented using the example of the quasi-binary oxide phase diagram $Ta_2O_5$—$SnO_2$.

Figure 5:
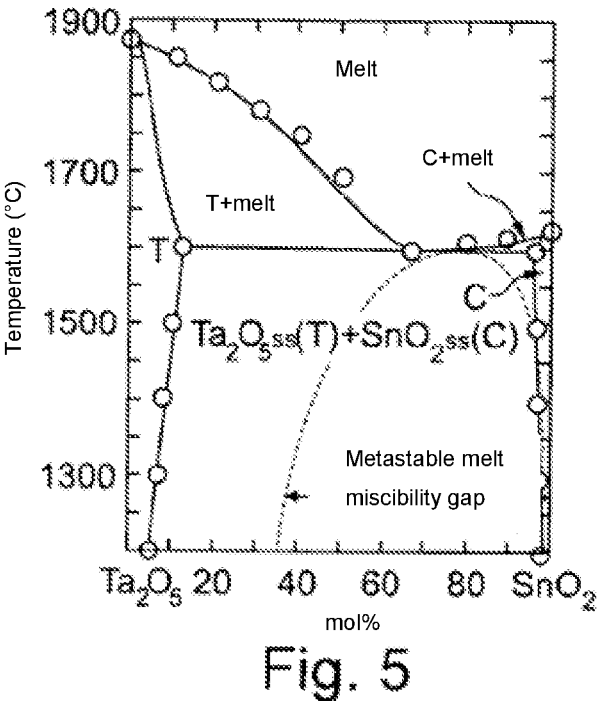
FIG. 5 shows a phase diagram of $Ta_2O_5$—$SnO_2$ above 1200° C.

FIG. 5 shows a calculated phase diagram for the catalyst system $Ta_2O_5$—$SnO_2$ for temperatures above T=1200° C., which originates from the dissertation "The Impact of Metal Oxides on the Electrocatalytic Activity of Pt Catalysts" by A. Rabis, ETH Zurich 2015. The mutual solubilities at lower temperatures must be extrapolated and estimated. The phase diagram shows that tin oxide in tantalum oxide has an initial solubility of about 7 mol % at the temperature mentioned, while the initial solubility of tantalum oxide in tin oxide is 1.1 mol %. It can accordingly be assumed that the solubilities are lower at room temperature or at the operating temperature of a fuel cell.

Figure 6:
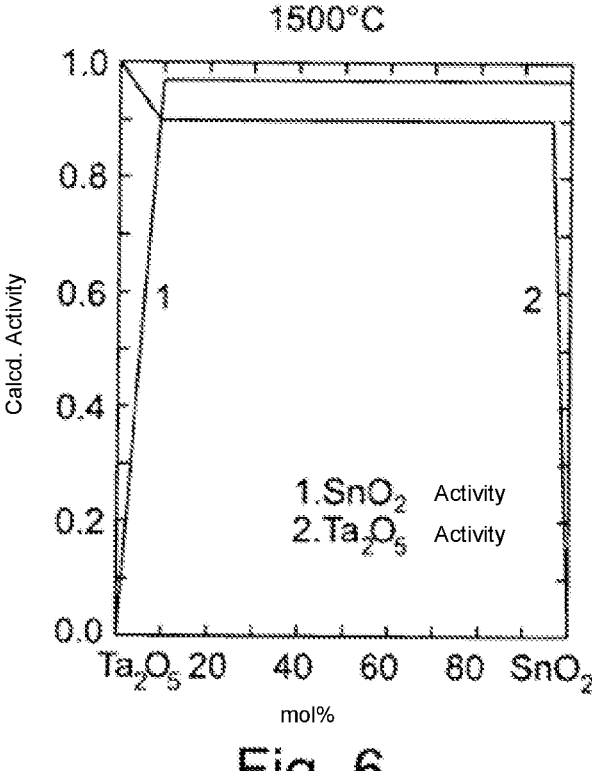
FIG. 6 shows the calculated activities of $Ta_2O_5$ and $SnO_2$ at 1500° C.

The activity profile of the two oxides at 1500° C. in the respective mixed phases is as shown in FIG. 6 (J. Am. Ceram. Soc., 95 [12], 4004-4007, (2012)). The stable thoreaulite phase $SnTa_2O_7$ is not included in this phase diagram according to FIG. 6. The tin is tetravalent in this compound. The electrical conductivity of the tin oxide is drastically increased with the solid solution of tin oxide with tantalum oxide. With an addition of tantalum oxide up to a maximum $\alpha$-solubility of 1.1 mol % to tin oxide, electrical conductivities of $7 \times 10^2$ S/cm$^2$ are achieved.

The increase in electrical conductivity rises steadily with the concentration of the solution up to the aforementioned phase boundary and then decreases again. When the solubility limit according to the phase diagram shown in FIG. 6 is exceeded, a two-phase region is formed from the SnO$_2$—Ta$_2$O$_5$ phase and the thoreaulite SnTa$_2$O$_7$ in equilibrium. The composition of the heterogeneous structure can be calculated with given concentrations according to the lever rule. If, for example, a total concentration of 10 mol % Ta$_2$O$_5$ in SnO$_2$ is chosen, the result is a composition of the heterogeneous structure of 88% Sn$_{0.99}$Ta$_{0.01}$O$_2$ and 2% SnTa$_2$O$_7$ as oxide composite.

The electrically highly conductive tin dioxide phase Sn$_{0.99}$Ta$_{0.01}$O$_2$ forms the carrier metal oxide and the thoreaulite phase SnTa$_2$O$_7$ forms the catalyst material which is finely dispersed in the grain of the carrier metal oxide. The precipitation conditions are determined on the one hand by the grain size produced and on the other hand by the metal oxide used was SnO$_2$ with about 1 mol % Ta$_2$O$_5$, wherein the mass fraction of this phase was in the range from 70 to 95% by weight.

Table 1 below shows the results of the catalyst systems of this type. The results were determined by means of a single cell consisting of two end plates, two graphite plates, two bipolar plates 2, 2' made of graphite, two gas diffusion layers 6, 6', the electrode 1 (cathode side) according to the invention, a standard Pt/C catalyst (anode side) and a polymer electrolyte membrane 7 made from Nation. The process gases, here air and hydrogen, were humidified differently on the cathode side and the anode side.

The electrode 1 had an electrode area of 30 mm×30 mm. The cell was operated at T=85° C. with p=2.5 bar. The settings used were $\lambda$=1.5 on the hydrogen side and $\lambda$=2 on the air side. A reference humidification temperature $T_B$ was set at 80° C.

The prepared coating thicknesses of the electrode 1 were in the range of from 1 to 5 μm.

TABLE 1

| Ratio of carrier (metal oxide)/catalyst material in wt. % | Carrier (metal oxide)/catalyst material | Grain size of the carrier metal oxide in nm | I (A/cm$^2$) & 0.7 V (T = 85° C.) | Onset voltage in V NHE |
|---|---|---|---|---|
| 80/20 | C/Pt | 2-4 | 1.1 | 0.95 |
| 50/7 | SnO$_2$—1%Ta$_2$O$_5$/Ta$_2$O$_5$—dop. | 100-125 | 0.65 | 1.05 |
| 35/15 | SnO$_2$—1%Ta$_2$O$_5$/Ta$_2$O$_5$—dop. | 100-125 | 0.75 | 1.1 |
| 35/15 | SnO$_2$—1%Ta$_2$O$_5$/Ta$_2$O$_5$—dop.0.1%Pt | 100-125 | 1.4 | 1.1 |
| 50/7 | SnO$_2$—2.5%Nb$_2$O$_5$/Ta$_2$O$_5$—dop. | 80-100 | 0.5 | 1.15 |
| 35/15 | SnO$_2$—2.5%Nb$_2$O$_5$/Ta$_2$O$_5$—dop. | 80-100 | 0.8 | 1.2 |
| 35/15 | SnO$_2$—2.5%Nb$_2$O$_5$/Ta$_2$O$_5$—dop.—0.1%Pt | 100-125 | 1.35 | 1.2 |
| 30/10 | SnO$_2$—2.5%Nb$_2$O$_5$/(Ti90Nb10)O$_2$—0.1%Pt | 80-100 | 0.95 | 0.85 | temperature-time diagram for setting the structure. By varying the composition, the proportions of the two phases of the oxide composite are changed.

However, the chemical activities of the first and second metallic elements in the oxides remain unchanged in the two-phase region, as do the respective basic electrical and chemical-physical properties. For catalysis, the triple phase boundary lengths as well as the energetic surface states of the carrier metal oxide can be set via the quantity and size ratios. Since the two phases, i.e., the carrier metal oxide and the catalyst material, are present in crystallographic structures that differ from one another, they are inherently dissolved with one another, i.e., the catalyst material is present as inherently dissolved dispersoids in the carrier metal oxide.

With RDE investigations (RDE=ring disc electrode) it was found that both the tantalum-rich $\beta$ phase and the thoreaulite phase SnTa$_2$O$_7$ have a comparatively good catalytic activity for oxygen reduction. This was verified with experiments in which the catalyst system was treated with a solution containing 2-[1-[difluoro[(trifluoroethenyl)oxy] methyl]-1,2,2,2-tetrafluoroethoxy]-1,1,2,2-tetrafluoroethanesulfonic acid as a polymer electrolyte material or ionomer, also known under the trade names Nation or Flemion, was applied to a carbon substrate (glassy carbon) to form an electrode. The onset voltages U were in the range of those for platinum. However, the specific currents i found were low: i<0.1 A/cm$^2$ at U=0.65 V.

In the next step, the individual phases were eliminated from the two-substance mixture. As stated above, the carrier According to Table 1, the current densities for catalyst systems according to the disclosure are 5-8 times higher than in experiments in which individual oxidic phases were deposited on a carbon substrate. The results in Table 1 impressively show that it is possible to produce platinum-free or significantly platinum-reduced and carbon-free electrodes with similarly good activities as in the conventional system of "platinum on carbon carriers".

The Triple Phase Boundary (TPB) length, the nanodisperse precipitated electrocatalytically active thoreaulite phase (=catalyst material), as well as the size of the individual grains in the microstructure can be optimized via the precipitation conditions from the Sn—Ta—O system. In this way, the electrolytic activity of the catalyst system for oxygen reduction can also be optimized.

The conductivity of the tin oxide, in which the tantalum oxide is dissolved up to the maximum limit solubility (approx. 1.1 mol %), depends heavily on the sintering temperature. It is important to ensure that the oxygen partial pressure above the powder is always high enough that the fully oxidized compounds are established. Otherwise, post-oxidation during cell operation and loss of activity can be expected. It is currently unclear whether the thoreaulite phase or the tantalum-rich $\beta$ phase actually occurs under the oxidative test conditions chosen. According to the test results, this is not decisive for the effectiveness of the catalyst system.

Furthermore, a sintering temperature must be set so high that later grain agglomeration is not to be expected and, on the other hand, the catalyst system is sufficiently stable even for use at lower temperatures. This risk would exist if the mutual solubilities in the $\alpha$ and $\beta$ phases were to change significantly. This is why the temperature program was chosen in such a way that initially sintering was carried out at higher temperatures of up to T=900° C. and the grain was adapted as closely as possible to the conditions in cell operation in the cooling program. Accordingly, a holding phase at T=250° C. over a period of 60 minutes is preferably set in the cooling program.

Embodiments of the catalyst system according to the disclosure are presented below. For this purpose, the powders were fluorinated with a nitrogen treatment and/or a carbon treatment (in particular with $C_2H_2$) and/or with the aid of $CF_4$. Exceptionally good results were already achieved with the samples treated with carbon or nitrogen. On the one hand, the onset voltage for oxygen reduction was positively shifted by approx. 50-100 mV compared to the Pt/C platinum standard and the area-specific current densities are comparable to platinum catalysts or higher.

Furthermore, a study was made of how further deposition of nanodisperse platinum particles affects the electrocatalytic effectiveness of the catalyst system. The platinum was deposited on the surface of the catalyst system no. 4 according to Table 2 by means of sputtering technology with an area coverage of <0.1 mg/cm². In the case of this catalyst system no. 4 with platinum, surprisingly high activities for oxygen reduction were found.

Overall, it can be stated that surprisingly high activities for oxygen reduction are found in the embodiments according to the disclosure of the catalyst system according to Table 2 both without platinum and with platinum. Using extremely loaded electrochemical investigations with CV measurements up to anodic potentials of 2000 mV NHE in sulfuric acid solution at pH=3 and T=85° C., it was also possible to demonstrate the high oxidation stability in 30-fold repeated cycles. It could even be shown that even up to 3000 mV NHE, especially in the phases rich in thoreaulite or $\beta$ phase, the samples show very good resistance to passivation and dissolution. The samples additionally loaded

TABLE 2

$D_{50}$, $d_{50}$ = mean particle size in nm; a = surface energy in mN/m; I (A/cm²)
measured with RDE at 2400 rpm and at 600 mV vs. NHE; x = 0 to 0.3; y = 0 to 0.2; w = 0.01 to 0.1

| Catalyst system | Ratio of carrier (metal oxide)/catalyst material in wt. % | Carrier (metal oxide)/catalyst material | Grain size of carrier (metal oxide) $D_{50}$ in nm | Grain size of catalyst material $d_{50}$ in nm | Surface treatment of carrier (metal oxide)/catalyst material | I (A/cm²) & 0.7 V with T = 85° C. | Onset voltage in V NHE | OT/K in (mN/m) |
|---|---|---|---|---|---|---|---|---|
| 1 | 50/10 | $SnO_2$—1%$Ta_2O_{5-x}Fx/Ta_2O_{4.8}N_{0.19}F_{0.01}$ | 100-125 | 3-5 | Fluorinated/nitrided & fluorinated | 0.75 | 1.08 | 25-28 |
| 2 | 35/14 | $SnO_2$—1%$Ta_2O_{5-x}N_yF_{xy}/Ta_2O_{4.9}C_{0.09}F_{0.01}$ | 100-125 | 3-5 | Nitrided & fluorinated/carburized & fluorinated | 0.8 | 1.03 | 22-25 |
| 3 | 35/15 | $SnO_2$—1%$Ta_2O_{5-x}C_yF_{xy}/Ta_2O_{5-xy}N_xF_y$ | 100-125 | 3-5 | Carburized & fluorinated/nitrided & fluorinated | 0.73 | 1.12 | 22-25 |
| 4 | 50/7 | $SnO_2$—1%$Ta_2O_{5-x}F_x/Ta_2O_{5-xy}C_xF_y$, coated with 0.1% Pt | 100-125 | 3-5 | Fluorinated/carburized & fluorinated | 1.4 | 1.11 | 25-28 |
| 5 | 35/15 | $(Ti, Zr)O_{2-x}N_yF_{xy}/Ta_2O_4C_{0.9}F_{0.1}$—1%$SnO_2$ | 50-70 | 3-10 | Nitrided & fluorinated/carburized & fluorinated | 0.4 | 0.8 | 25-28 |
| 6 | 80/20 | C/Pt | — | 2-5 | Hydrophobized | 1.1 | 0.95 | — |
| 7 | 65/35 | $Ti_2ZrO_{6-x}N_x/(Ti, Nb)O_{2-x}C_x$ coated with 0.1% Pt | 75-90 | 3-5 | Nitrided/carburized | 0.9 | 0.85 | 45 |
| 8 | 65/35 | $Ti_2ZrO_{6-x}N_xF_y/(Ti_{90}Nb_{10})O_{2-x}C_x$ coated with 0.1% Pt | 75-90 | 3-5 | Nitrided & fluorinated/carburized | 0.98 | 0.98 | 22-28 |
| 9 | 65/35 | $SnO_2$—1%$Ta_2O_{5-x}Fx/Ta_{2-w}W_wO_{4.8}N_{0.19}F_{0.01}$ | 100-125 | 3-5 | Fluorinated/nitrided & fluorinated | 0.9 | 1.08 | 24-28 |
| 10 | 65/35 | $SnO_2$—1%$Ta_2O_{5-x}F_x/Ta_{2-w}M_{ow}O_{4.8}N_{0.19}F_{0.01}$ coated with 0.05% Pt | 100-125 | 3-5 | Fluorinated/nitrided & fluorinated | 0.9 | 1.08 | 24-28 |

Before the samples were actually measured in small cells, they were each subjected to a CV stress test, namely a repeated exposure between −100 mV to 2000 mV vs. NHE. With these "rapid examinations", on the one hand, the hydrogen sensitivity thereof and the oxidation resistance thereof can be reliably determined. It was found that the samples without $CF_4$ treatment increasingly passivate during operation. The samples with $CF_4$ treatment (compare Tab. 2) remained stable even after more than 50 repeated cycles under the rigid conditions.

with platinum (see Tab. 1 and Tab. 2) changed with the cycles, however, towards lower specific currents.

Similar results were achieved with the same type of niobium-containing tin oxide composites. Niobium oxide has a slightly higher solubility in tin oxide than tantalum oxide. The limit solubility for niobium oxide is 2.5 at. %. With niobium oxide, stable stoichiometric phases $SnNb_2O_7$ ("froodite") similar to the thoreaulite phase are formed. The activities measured are lower than with the tantalum-based catalyst systems, which can be explained by, among other things, the different pzzp values set. However, it should be noted at this point that the activities depend very heavily on the manufacturing conditions.

The use of the catalyst system according to the disclosure for future fuel cells brings with it considerable advantages, both economically and in terms of long-term stability and increased catalytic activity.

The temperature treatment of the catalyst system has a great influence in several respects on the desired results with regard to the activity and electrical conductivity of the catalyst system. On the one hand, the density of the carrier metal oxide, for example the stoichiometric tin oxide, is set by means of the temperature treatment, taking into account the decomposition pressure of the compound at sintering temperatures above 950° C. On the other hand, the temperature treatment determines the precipitation conditions of the dispersoids, i.e., the catalyst material. For example, if the oxide is treated appropriately, pure $Ta_2O_5$ is precipitated at the grain boundaries of the tin oxide. It follows from this that the temperature treatment, as described above, must take place in such a way that the phases that are stable for fuel cell operation are established. For example, the $SnO_2$—$Ta_2O_5$ carrier material is produced in such a way that the starting materials are intimately mixed in the desired ratio in a ball mill and tempered at a temperature in the range of 700-800° C. under oxygen for a period of $t_1=30$ min. It is then cooled to a temperature of 250° C. and this temperature is maintained for a period of time $t_2=1$ h. Finally, the catalyst system is cooled to room temperature.

LIST OF REFERENCE SYMBOLS

1, 1' Electrode (cathode side)
2, 2' Bipolar plate
2a, 2a' Carrier plate
3a Inflow region
3b Outlet region
4, 4' Opening
5 Gas distribution structure
6, 6' Gas diffusion layer
7 Polymer electrolyte membrane
8 Coating (anode side)
9 Catalyst system
10 Fuel cell
100 Fuel cell system

The invention claimed is:

1. A catalyst system comprising, an electrically conductive carrier metal oxide having an electrical conductivity $\lambda_1$ of at least 10 S/cm, the carrier metal oxide having at least two first metallic elements selected from the group of non-precious metals consisting of tin, tantalum, niobium, titanium, hafnium, and zirconium, and having a structure comprising oxide grains with a grain size of at least 30 nm;

an electrically conductive, metal oxide catalyst material having an electrical conductivity $\lambda_2$ of at least 10 S/cm, the catalyst material having at least one second metallic element from the group of non-precious metals comprising tantalum, niobium, hafnium, zirconium, iron, tungsten, and molybdenum, the at least two first metallic elements in the carrier metal oxide and the at least one second metallic element in the catalyst material each being present in a solid stoichiometric compound or solid homogeneous solution;

the carrier metal oxide having a first crystal lattice structure comprising first oxygen lattice sites and first metal lattice sites, the carrier metal oxide on the first oxygen lattice sites being doped with at least one of fluorine and at least one element from the group comprising nitrogen, carbon, or boron;

the catalyst material having a second crystal lattice structure comprising second oxygen lattice sites and second metal lattice sites, wherein the catalyst material on the second oxygen lattice sites is doped with fluorine and at least one element from the group comprising nitrogen, carbon, or boron; and the carrier metal oxide and the catalyst material differing in a composition thereof, a near-surface pH, called pzzp value (pzzp=point of zero zeta potential), of the carrier metal oxide and the catalyst material differ, and the catalyst material and the carrier metal oxide at least forming a two-phase disperse oxide composite;

wherein the carrier metal oxide and the catalyst material differ in a surface energy thereof, wherein a first phase of the at least two-phase disperse oxide composite has a more hydrophobic surface than a further surface of at least one further phase, and the surface energy of the more hydrophobic surface of the first phase is in a range from 22 to 28 $Nm/mm^2$.

2. The catalyst system according to claim 1, wherein a surface energy of the further surface of the at least one further phase is greater than 35 $Nm/mm^2$.

3. The catalyst system according to claim 1, wherein the first metallic elements are formed by tin and by at least one metal from the group consisting of tantalum, niobium, titanium, hafnium, and zirconium.

4. The catalyst system according to claim 1, wherein the catalyst material has a structure comprising oxide grains with a grain size in a range from 1 nm to 50 nm.

5. The catalyst system according to claim 1, wherein the carrier metal oxide is doped on the first metal lattice sites with at least one element from the group comprising iridium and ruthenium.

6. The catalyst system according to claim 1, wherein the pzzp value of the catalyst material is lower than the pzzp value of the carrier metal oxide.

7. The catalyst system according to claim 1, further comprising platinum applied to a surface of the catalyst system in an amount of at most 0.1 $mg/cm^2$.

8. An electrode comprising a catalyst system (9) according to claim 1.

9. The electrode according to claim 8, further comprising platinum applied to a free surface of the electrode in an amount of at most 0.2 $mg/cm^2$.

10. A fuel cell or electrolyzer, comprising at least one electrode according to claim 8 and at least one polymer electrolyte membrane.

11. The fuel cell or electrolyzer according to claim 10, wherein the electrode includes an ionomer, and the polymer electrolyte membrane and the ionomer contained in the electrode are formed from identical materials.

12. The catalyst system according to claim 1, wherein the carrier metal oxide on the first oxygen lattice sites is additionally doped with hydrogen.

13. The catalyst system according to claim 1, wherein the catalyst material on the second oxygen lattice sites is additionally doped with hydrogen.

14. The fuel cell of claim 10, wherein the fuel cell is oxygen-hydrogen fuel cell.

15. A catalyst system comprising:

an electrically conductive carrier metal oxide having at least two first metallic elements selected from the group of non-precious metals consisting of tin, tantalum, niobium, titanium, hafnium, and zirconium, and having a structure comprising oxide grains;

an electrically conductive, metal oxide catalyst material having at least one second metallic element from the group of non-precious metals comprising tantalum, niobium, hafnium, zirconium, iron, tungsten, and molybdenum, the at least two first metallic elements in the carrier metal oxide and the at least one second metallic element in the catalyst material each being present in a solid stoichiometric compound or solid homogeneous solution;

the carrier metal oxide having a first crystal lattice structure comprising first oxygen lattice sites and first metal lattice sites, the carrier metal oxide on the first oxygen lattice sites being doped with at least one of fluorine and at least one element from the group comprising nitrogen, carbon, or boron;

the catalyst material having a second crystal lattice structure comprising second oxygen lattice sites and second metal lattice sites, wherein the catalyst material on the second oxygen lattice sites is doped with fluorine and at least one element from the group comprising nitrogen, carbon, or boron; and the carrier metal oxide and the catalyst material differing in a composition thereof, such that a near-surface pH, called pzzp value (pzzp=point of zero zeta potential), of the carrier metal oxide and the catalyst material differ, with the pzzp value of the catalyst material being lower than the pzzp value of the carrier metal oxide, and the catalyst material and the carrier metal oxide at least forming a two-phase disperse oxide composite;

wherein the carrier metal oxide and the catalyst material differ in a surface energy thereof, wherein a first phase of the at least two-phase disperse oxide composite has a more hydrophobic surface than a further surface of at least one further phase, and a surface energy of the further surface of the at least one further phase is greater than 35 $Nm/mm^2$.

\* \* \* \* \*